United States Patent
Zhu et al.

(10) Patent No.: US 9,124,177 B2
(45) Date of Patent: Sep. 1, 2015

(54) SYSTEMS AND METHODS OF SMOOTH LIGHT LOAD OPERATION IN A DC/DC CONVERTER

(75) Inventors: Weidong Zhu, East Lyme, CT (US); Xuening Li, Cary, NC (US); Hal Chen, Jersey City, NJ (US); Wenkai Wu, East Greenwich, RI (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 552 days.

(21) Appl. No.: 12/854,097

(22) Filed: Aug. 10, 2010

(65) Prior Publication Data

US 2012/0038331 A1    Feb. 16, 2012

(51) Int. Cl.
*G05F 1/00* (2006.01)
*H02M 3/158* (2006.01)
*H02M 1/00* (2007.01)

(52) U.S. Cl.
CPC .... *H02M 3/1588* (2013.01); *H02M 2001/0032* (2013.01); *Y02B 70/1466* (2013.01); *Y02B 70/16* (2013.01)

(58) Field of Classification Search
USPC ............................. 323/282–284, 288, 234, 237
See application file for complete search history.

(56) References Cited

U.S. PATENT DOCUMENTS

| | | | |
|---|---|---|---|
| 6,885,331 B2* | 4/2005 | Krymski | 341/169 |
| 2006/0055389 A1* | 3/2006 | Rice | 323/288 |
| 2007/0120547 A1* | 5/2007 | Tateishi et al. | 323/282 |
| 2008/0218134 A1* | 9/2008 | Kawakami et al. | 323/238 |
| 2008/0284398 A1* | 11/2008 | Qiu et al. | 323/283 |
| 2009/0072807 A1* | 3/2009 | Qiu et al. | 323/285 |
| 2010/0066328 A1* | 3/2010 | Shimizu et al. | 323/282 |
| 2010/0253309 A1* | 10/2010 | Xi et al. | 323/288 |

* cited by examiner

*Primary Examiner* — Jeffrey Gblende
(74) *Attorney, Agent, or Firm* — William B. Kempler; Frank D. Cimino

(57) ABSTRACT

Systems and devices for smooth light load operation in a DC/DC converter are presented. The disclosed systems and methods enable smooth discontinuous conduction mode (DCM)/continuous conduction mode (CCM) transition. The disclosed systems and methods of smooth light load operation in a DC/DC converter may also avoid the generation of sub-harmonics during light load operation. In an example embodiment, a rising ramp is used to control the ON time of the converter oscillator, while a falling ramp controls the OFF time. During DCM operation, the minimum value of the falling ramp is clamped. The clamping of the falling ramp ensures a substantially similar level of the error amplifier output in both CCM and DCM and avoids disturbances caused by a difference in the error amplifier outputs between the modes.

16 Claims, 8 Drawing Sheets

US 9,124,177 B2

SYSTEMS AND METHODS OF SMOOTH LIGHT LOAD OPERATION IN A DC/DC CONVERTER

TECHNICAL FIELD

The present disclosure is generally related to electronics and, more particularly, is related to power supply controllers.

BACKGROUND

A buck converter, as provided in example circuit 100 of FIG. 1, operates by applying a pulse width modulated (PWM) waveform to L-C filter 103 comprising inductor 125 and capacitor 130. L-C filter 103 averages the PWM waveform, resulting in a DC output voltage. A variation on a simple buck replaces a "catch" diode with controlled switch 115, or Synchronous Rectifier (SR). Synchronous rectifier 115 generally has lower losses than a conventional or Schottky diode, and so its use is quite popular in low voltage DC/DC converters. There are heretofore unaddressed needs with dc/dc converter systems and methods.

SUMMARY

Example embodiments of the present disclosure provide systems of smooth light load operation in a DC/DC converter. Briefly described, in architecture, one example embodiment of the system, among others, can be implemented as follows: an inductor; a controller device electrically connected to the inductor, the controller device configured to regulate an output; and an oscillator circuit, the oscillator circuit electrically connected to the controller device, the oscillator configured with a first rising ramp signal and a second falling ramp signal, the falling ramp signal configured to clamp when inductor current enters discontinuous conduction mode.

Embodiments of the present disclosure can also be viewed as providing methods for smooth light load operation in a DC/DC converter. In this regard, one embodiment of such a method, among others, can be broadly summarized by the following: regulating an output with a DC/DC converter comprising at least one inductor and an oscillator configured with a first rising ramp signal and a second falling ramp signal; and clamping the second falling ramp signal when the converter enters discontinuous conduction mode.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

In an ideal (lossless) buck converter, the input voltage and the duty cycle of the switch determine the output voltage.

$$VOUT = D \times VIN = \left(\frac{ton}{TS}\right) \times VIN$$

where duty cycle D is defined as the ratio of the main switch ON time to the total period. This relationship holds as long as there is continuous current flowing in the inductor. Another important relationship relates the inductor value to the amount of AC ripple current in the converter.

$$\Delta IL = \frac{(Vin - Vout) \times D \times TS}{L}$$

where ΔIL is the peak-to-peak ripple current in the output inductor. Notice the effect the input to output voltage differential has on the result.

Figure 1:
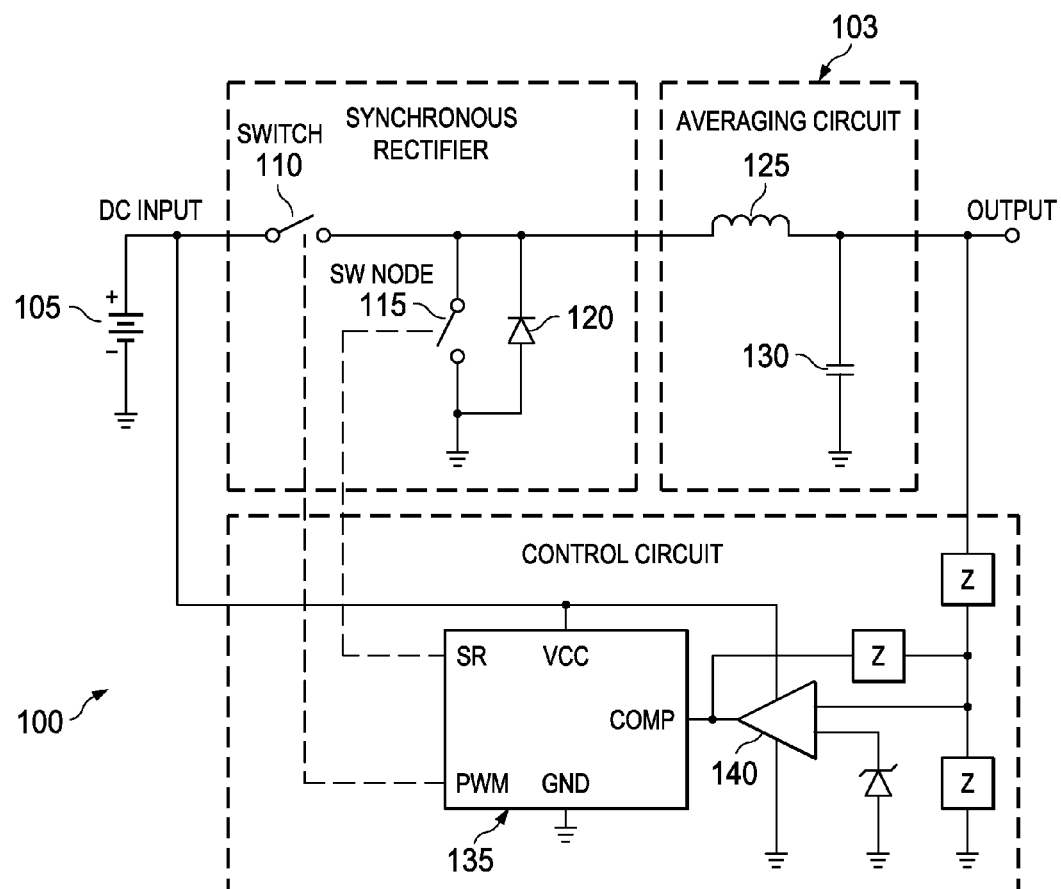
FIG. 1 is a circuit diagram of an example embodiment of a prior art DC/DC converter.
Figure 2:
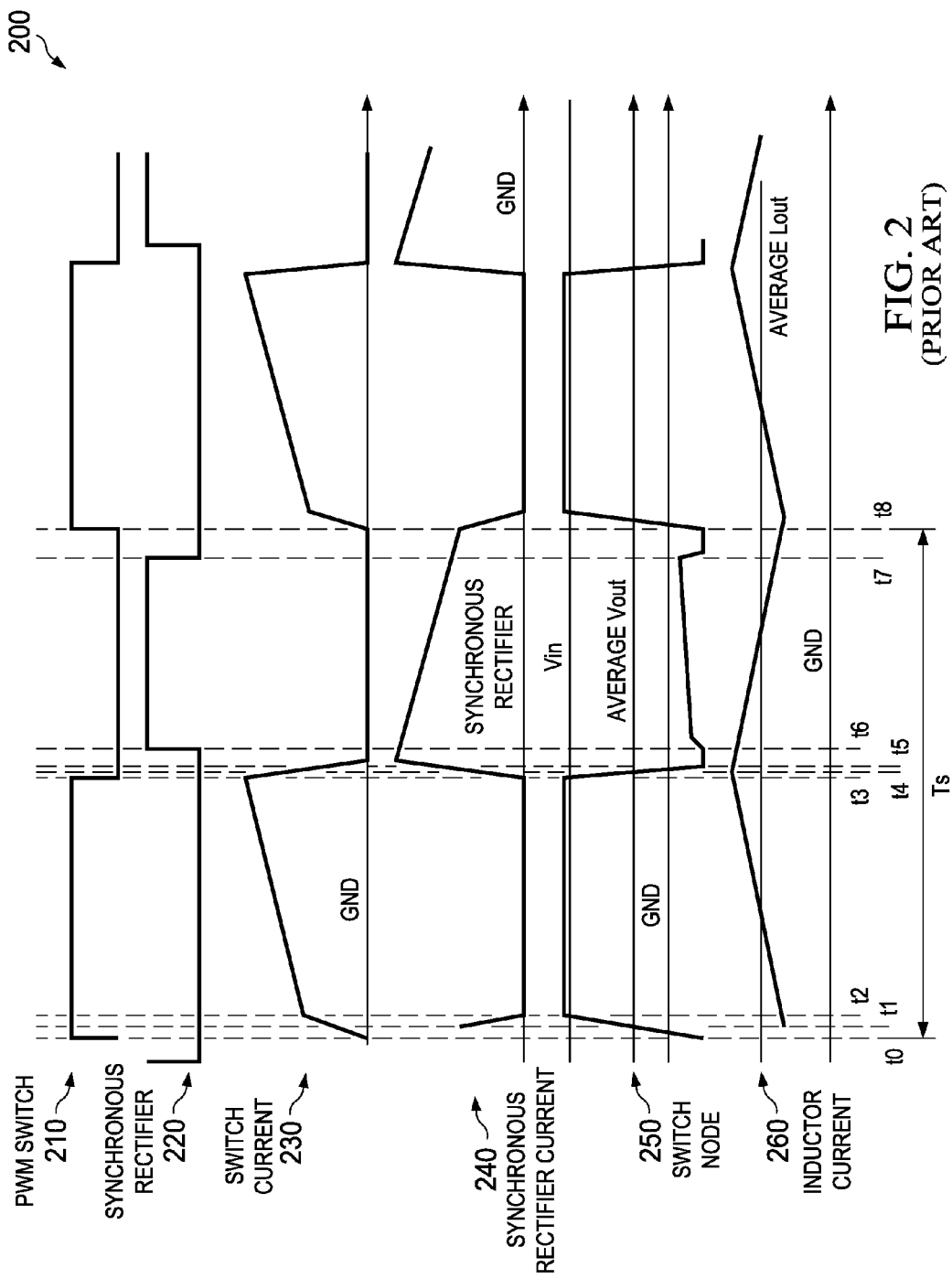
FIG. 2 is a timing diagram of an example embodiment of the circuit of FIG. 1.

FIG. 2 provides timing diagram 200 of a switching cycle for a converter such as the circuit provided in FIG. 1. At some time just prior to t0, signal 220 from control IC 135 turns OFF SR 115. At t0, PWM signal 210 turns ON main switch 110 and inductor current 260 starts to transition from SR 115 to switch 110. At t1, SW node voltage 250 rises above the Vout voltage level and the current in switch 110 and inductor 125 begins to increase as shown with signals 230 and 260. At t2, the switching transition is complete. At t3, PWM signal 210 turns OFF switch 110, and inductor current 260 begins to transition to body diode 120 of SR 115. At t4, SW node voltage 250 falls below Vout and the current in SR 115 and in inductor 125 shown in signals 240 and 260 begins to decrease. At t5, the transition is complete and inductor current 260 continues decreasing. At this time, the current is still fully in SR body diode 120. At t6, gate signal 220 driving SR 115 turns ON SR 115 and the current transitions from body diode 120 of that MOSFET to its channel. During the t6-t7 interval, the voltage across SR 115 decays because of the decay of the current in inductor 125. At t7, SR gate signal 220 turns OFF SR 115 and inductor current 260 transitions from the channel back to body diode 120. At t8, the cycle starts again with PWM signal 210 turning on switch 110.

Figure 3:
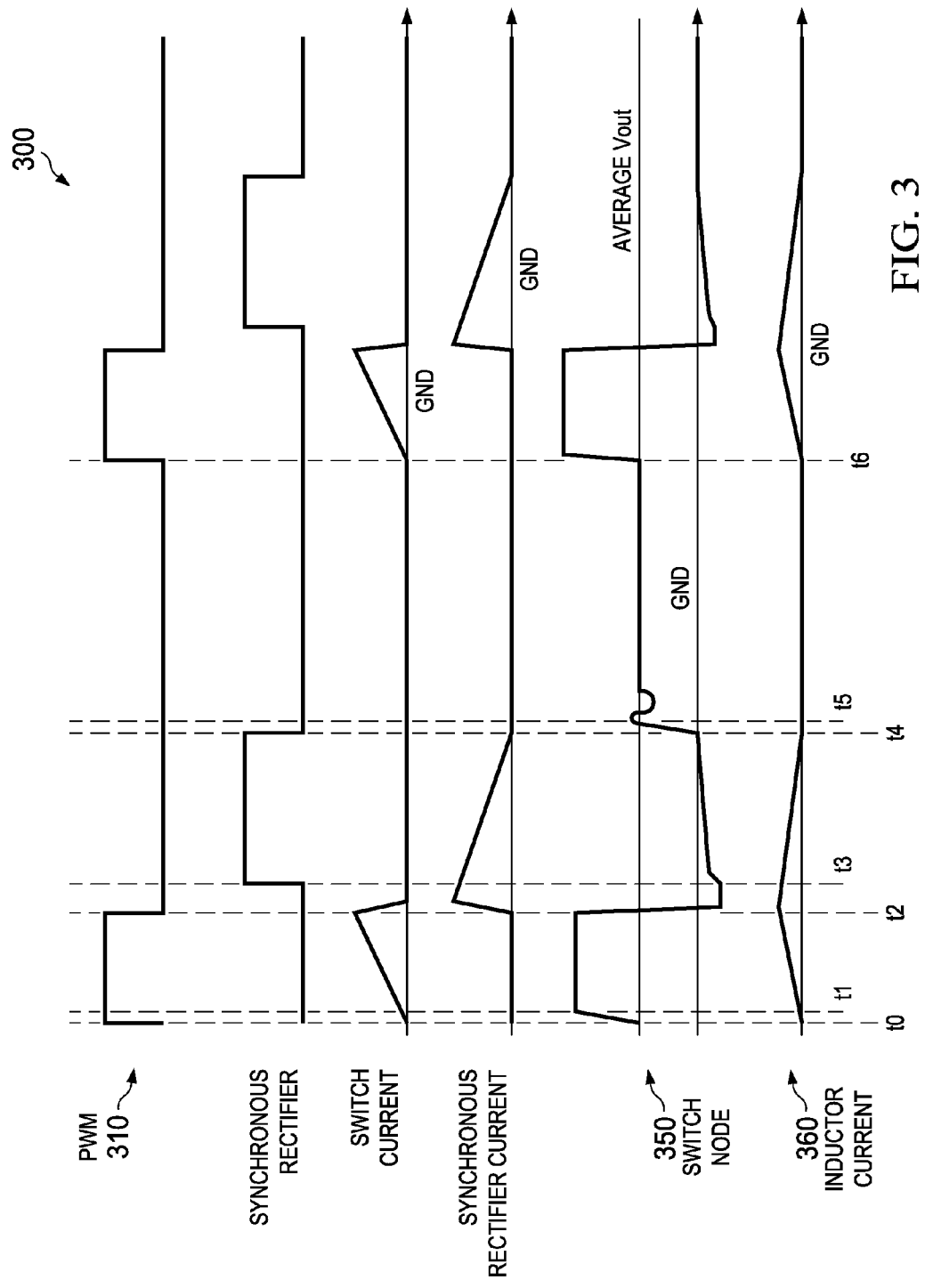
FIG. 3 is a timing diagram of an example embodiment of the circuit of FIG. 1.

One of the key differences in circuit operation between a synchronous and a non-synchronous converter occurs at light loads when the converter's DC load current is less than half the magnitude of the peak-to-peak ripple current (ΔIL) in the output inductor. In a non-synchronous buck converter, when the inductor current valley attempts to go below zero, current no longer flows due to the rectifier diode's blocking effect as shown in timing diagram 300 in FIG. 3. In this condition, the inductor is running "discontinuous" because flow of inductor current 360 is interrupted. When this occurs at t4, SW node voltage 350 rings up to the output voltage (t4 to t5) and settles at that level until the next switching cycle of PWM signal 310 begins at t6. This low energy ringing is generated by the energy in the inductor resonating with MOSFET parasitic capacitance. When the inductor goes discontinuous, the duty cycle required to maintain output voltage regulation is no longer simply the ratio of the output voltage to the input voltage, but is determined by the relationship:

$$D = \sqrt{\frac{2 \times L}{Zout \times TS} \times \frac{Vout^2}{Vin^2 - Vin \times Vout}}$$

Notice that D is no longer a linear function of the input-to-output ratio. This is because the inductor acts as a current source feeding the output impedance of the converter. The issue that arises from this effect is that the closed loop gain of the converter is reduced, and is no longer a linear function.

Synchronous converter 100 either (1) can allow current to flow in only one direction as a non-synchronous converter does, or, (2) by allowing the synchronous rectifier 115 to remain ON for the entire t3 to t5 interval, can operate so that current is allowed to flow in the reverse direction. If current is continuous in output inductor 125, then the output voltage remains a linear function of the duty cycle and the loop stability remains constant over the entire load current range. A disadvantage is that under light loads, there is now power dissipated in the channel of SR 115 and in inductor 125 as current flows in the reverse direction.

In applications such as computing power management, light load efficiency becomes more and more important. DC-DC controllers with light load capability are used in mobile computing power and have being adopted in server power applications. Traditional light load control topologies may involve pulse skipping, causing sub-harmonics caused by the skipped pulse.

Disclosed herein are systems and methods of smooth light load operation in a DC/DC converter, which may enable smooth discontinuous conduction mode (DCM)/continuous conduction mode (CCM) transition. The disclosed systems and methods of smooth light load operation in a DC/DC converter may also avoid the generation of sub-harmonics during light load operation. In an example embodiment, a rising ramp is used to control the ON time of the converter oscillator, while a falling ramp controls the OFF time. A modulator using these rising and falling ramps enables smooth DCM/CCM transition without compromising transient performance.

In an example embodiment, during DCM operation, the minimum value of the falling ramp is clamped. The clamping of the falling ramp ensures a substantially similar level of the error amplifier output in both CCM and DCM and avoids disturbances caused by a difference in the comparator outputs between the modes. The DCM-CCM transition may be determined by zero crossings. When there is no zero crossing for a value of M consecutive PWM cycles, the converter is determined to have entered CCM mode. The value of M may be determined by determining a minimum number of events without a zero-crossing without chattering on the output so that load transient will not be compromised. In an example implementation, the value of M may be 2. The CCM-DCM transition may also be determined by zero crossings. When the inductor current is zero for N consecutive PWM cycles, the converter is determined to have entered DCM mode. The dual-ramp modulator enables a faster transient response than single edge modulator. The value of N may be less critical since staying in CCM for a longer will not negatively affect the transient response. In an example implementation, the value of N may be 8.

When the output load is decreased, the converter may enter DCM if it initially operates in CCM. The CCM-DCM transition is determined by a zero crossing of the inductor current. The zero crossing comparator outputs "HIGH" when the inductor current reaches zero. If the controller detects a number N of consecutive "HIGH" levels from the zero crossing comparator for each PWM cycle, then the converter enters DCM.

Figure 4:
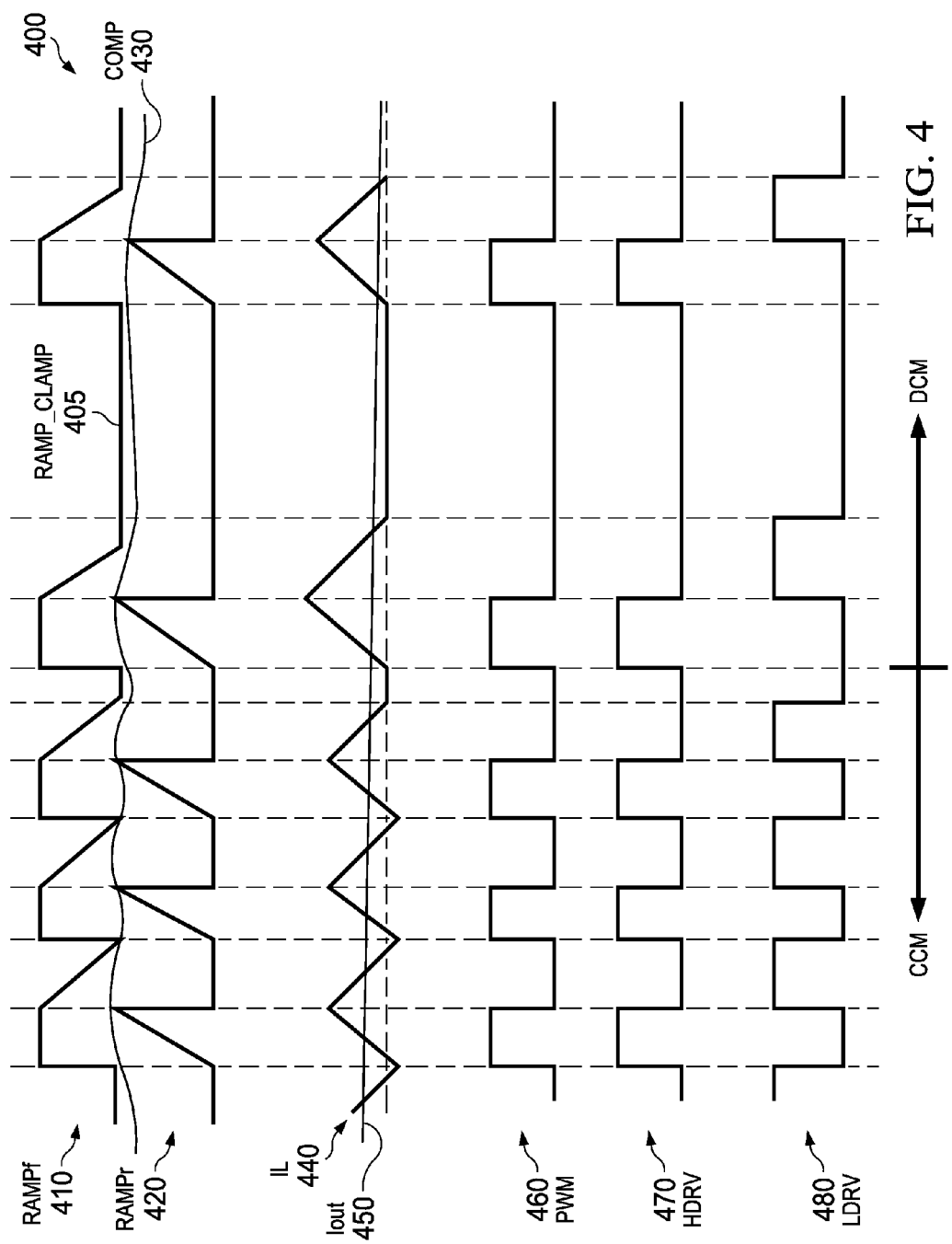
FIG. 4 is a timing diagram of an example embodiment of a circuit using the disclosed systems and methods of smooth light load operation in DC/DC converters.

Timing diagram 400 for an example embodiment of the systems and methods of smooth light load operation in a DC/DC converter is shown in FIG. 4. In this example embodiment, two ramps may be employed in each switching cycle. A first rising ramp 420 may be similar to the ramp in traditional trailing edge modulators, controlling the on time of a switching oscillator. A second falling ramp 410 may be employed to control the off time of the switching oscillator.

When output load 450 reaches approximately half the average value of inductor ripple current 440, the converter enters CCM for a synchronous buck converter. The switching cycle starts when the output of the error amplifier, COMP signal 430, crosses falling ramp 410. When COMP 430 crosses falling ramp 410, PWM signal 460 may be turned on and falling ramp 410 may be reset to the maximum value of rising ramp 420, which may be proportional to Vin. During the time in which the falling ramp resets to a maximum value, rising ramp 420 starts to rise at a preconfigured slew rate. When rising ramp 420 reaches COMP 430, PWM pulse 460 may be turned off, and rising ramp 420 is reset to a low signal. During the time in which the rising ramp resets to a minimum value, falling ramp 410 may fall at a rate substantially equal to the rate that rising ramp 420 rises.

When Iout 450 is reduced, the converter may enter discontinuous conduction mode (DCM). The operation is substantially similar to CCM except that falling ramp 410 will be clamped to a preset value (RAMP CLAMP 405). In an example embodiment, preset RAMP CLAMP 405 may be proportional to the output voltage of the converter. Also, the slew rate of rising ramp 420 may be decreased by a value, for example, of twenty-five percent so the on time will increase by twenty-five percent to generate hysteresis. In an example embodiment, RAMP CLAMP 405 is set to a value proportional to Vout. Thus the value of COMP 430 during CCM and DCM will at same level so there will be no disturbance because there is no change to COMP 430 during a DCM/CCM transition. HDRV 470, the signal that turns on the high side transistor, turns on when falling ramp 410 goes high and turns off when the rising ramp 420 falls to zero. LDRV 480, the signal that turns on the low side transistor, turns on when rising ramp 420 falls to zero and turns off when falling ramp 410 goes to zero or to RAMP CLAMP 405.

Figure 5:
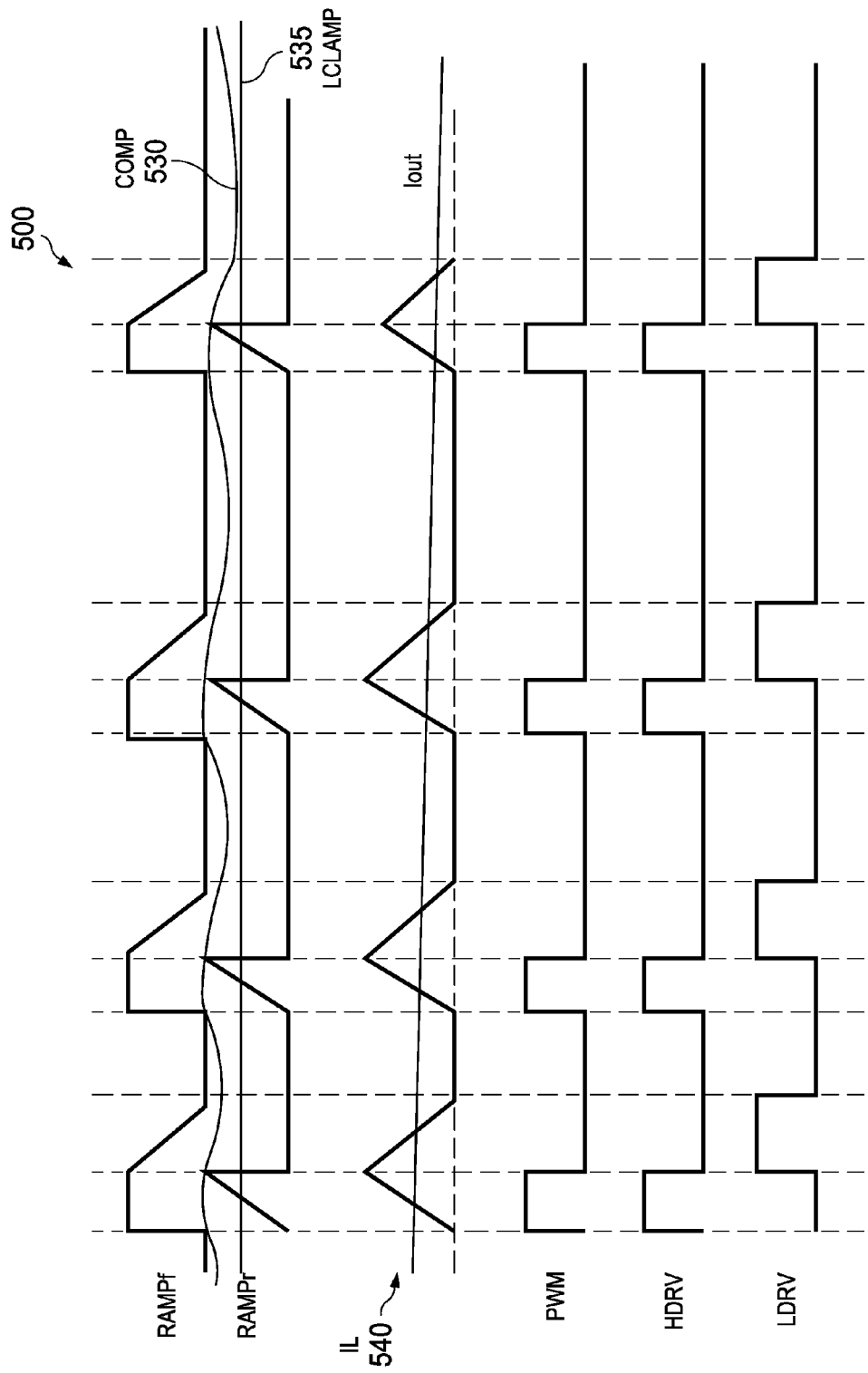
FIG. 5 is a timing diagram of an example embodiment of a circuit using the disclosed systems and methods of smooth light load operation in DC/DC converters.

In timing diagram 500 of an example embodiment shown in FIG. 5, to avoid COMP 530 from dropping too low, LCLAMP 535 is set to clamp COMP 530. In an example embodiment, LCLAMP 535 may be set based on process variation. Similarly to the embodiment in FIG. 4, the low-side FET will be turned off when inductor current 540 reaches zero.

Figure 6:
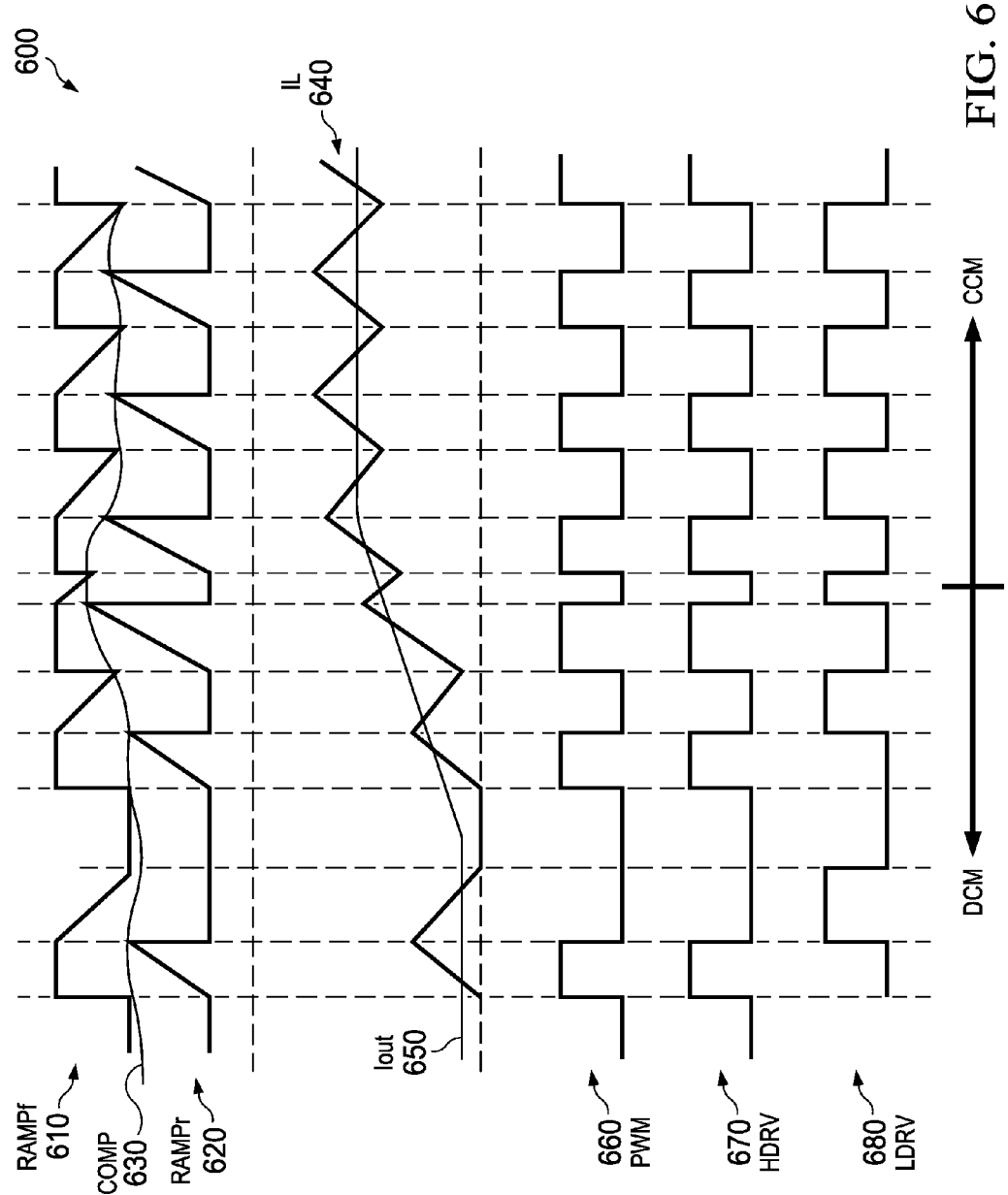
FIG. 6 is a timing diagram of an example embodiment of a circuit using the disclosed systems and methods of smooth light load operation in DC/DC converters.

The DCM to CCM transition may be determined by zero crossings. Timing diagram 600 as an example embodiment is provided in FIG. 6. Rising ramp 620, falling ramp 610, COMP 630, are again implemented in this example embodiment. When the converter is initially operating in DCM and load current 650 is increased, inductor current 640 will be higher than zero and no zero crossing will be detected. If no zero crossing is detected for a value of M consecutive cycles of PWM signal 660, the converter will enter CCM. Falling ramp 610 will not be clamped to RAMP CLAMP during CCM. PWM 660, HDRV 670, and LDRV 680 have substantially similar relationships to falling ramp 610 and rising ramp 620 as in previous example embodiments such as the example embodiment of FIG. 4.

Figure 7:
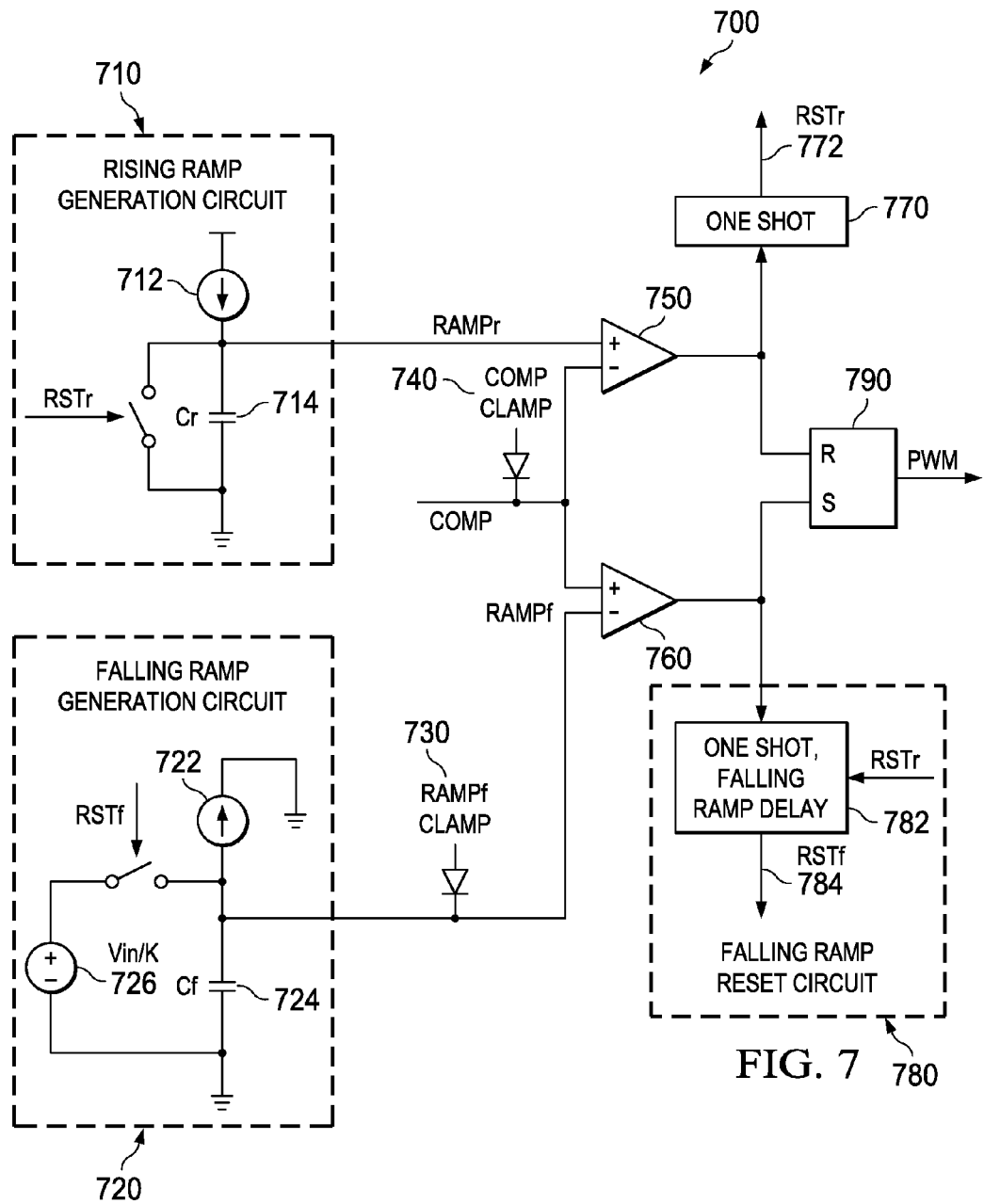
FIG. 7 is a circuit diagram of an example embodiment of a circuit using the disclosed systems and methods of smooth light load operation in DC/DC converters.

FIG. 7. Provides circuit diagram 700 for an example embodiment of the rising and falling ramp generation circuits and the implementation of these ramps in CCM/DCM transitions. An example embodiment of rising ramp generation circuit 710 includes current source 712 and rising ramp capacitor 714. The shape of the rising ramp can be set with the value of current source 712 and rising ramp capacitor 714. The slew rate of the ramp may be set according to the formula $$\frac{dv}{dt} = \frac{i}{c}.$$

Rising reset signal 772 resets the output of rising ramp generation circuit 710. Rising ramp generation circuit 710 may be comprised of discrete components and/or one or more integrated circuit devices.

An example embodiment of falling ramp generation circuit 720 includes current source 722 and falling ramp capacitor 724. The shape of the falling ramp can be set with the value of current source 722 and falling ramp capacitor 724. The slew rate of the ramp may be set according to the formula $$\frac{dv}{dt} = \frac{i}{c}.$$

Falling reset signal 784 resets the output of falling ramp generation circuit 720 to voltage source 726. In an example embodiment, voltage source 726 is proportional to an input voltage. Falling ramp generation circuit 720 may be comprised of discrete components and/or one or more integrated circuit devices. The output of falling ramp generation circuit 720 may be clamped to a minimum value by falling ramp clamp signal 730. In an example embodiment, falling ramp clamp signal 730 is proportional to the output voltage.

In an example embodiment, the rising ramp signal at the output of rising ramp generation circuit 710 is compared to COMP signal 740 by comparator 750. Additionally, the falling ramp signal at the output of falling ramp generation circuit 720 is compared to COMP signal 740 by comparator 760. In an example embodiment, COMP signal 740 may be clamped at a LCLAMP value. The output of comparator 760 sets the output of RS flip flop 790, and the output of comparator 750 resets the output of RS flip flop 790. The output of RS flip flop 790 may be used for the PWM signal for the DC/DC converter.

In an example embodiment, the output of comparator 750 also starts one shot timer 770 which generates rising ramp reset signal 772. One shot timer 770 sets the delay time for the reset of rising ramp reset signal 772. Falling ramp reset circuit 780 generates falling ramp reset signal 784. One shot timer 782 receives the output of comparator 760 and rising ramp reset 772 to produce falling ramp reset signal 784. Using the example embodiment circuit of FIG. 7, the rising ramp signal is used to control the ON time of the PWM oscillator signal and the falling ramp signal is used to control the OFF time of the PWM oscillator signal. During DCM operation, the minimum value of the falling ramp may be clamped to the falling ramp clamp value. The ramp clamping operation ensures the same error amplifier COMP level at the comparator input for both CCM and DCM and avoids disturbances in the output caused by differences in the COMP signal.

Figure 8:
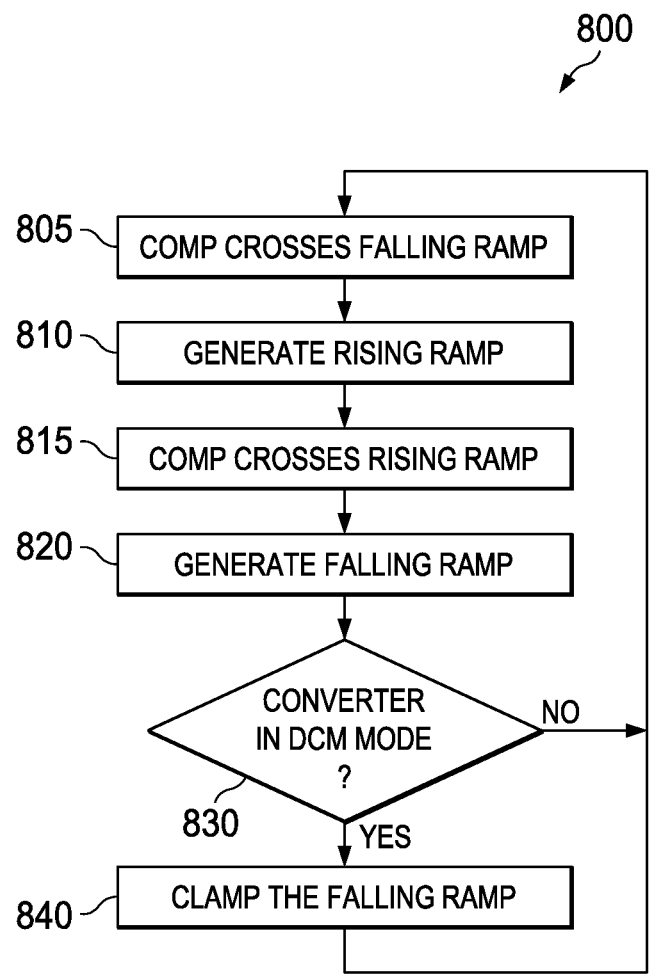
FIG. 8 is a flow diagram of an example embodiment of the disclosed methods of smooth light load operation in DC/DC converters.

FIG. 8 provides flow diagram 800 of an example embodiment of methods of smooth light load operation in a DC/DC converter. In block 805, the output of the error amplifier, COMP intersects the falling ramp, and, in block 810, a rising ramp for the oscillator is generated. In block 815, COMP intersects the rising ramp, and, in block 820, another falling ramp for the oscillator is generated. In block 830, a determination is made as to whether the converter is operating in DCM. In an example embodiment, a zero crossing detector is used to determine if the inductor current goes to zero for a number of oscillator clock cycles. If the converter is in DCM, for example, if the inductor current is zero for a number of oscillator clock cycles, in block 840, the falling ramp is clamped. In an example embodiment, the falling ramp is clamped to a value proportional to the input voltage. In an alternative embodiment, the falling ramp may be clamped to a constant clamp voltage value. In block 830, if the converter is not in DCM, the method of smooth light load operation checks again. After the falling ramp is clamped in block 840; the smooth light load operation method again checks if COMP intersects the falling ramp in block 805.

Although the present invention has been described in detail, it should be understood that various changes, substitutions and alterations can be made thereto without departing from the spirit and scope of the invention as defined by the appended claims.

Therefore, at least the following is claimed:

1. A DC-DC converter, comprising:
   a switch; and
   a voltage mode controller, the controller comprising:
   a rising ramp signal generator;
   a falling ramp signal generator;
   a falling ramp clamp configured to clamp an output of the falling ramp signal generator;
   a first comparator configured to compare a rising ramp signal to an output of an error amplifier (COMP signal) for generating an on time for controlling the switch;
   a second comparator configured to compare a falling ramp signal to the COMP signal for generating an off time for controlling the switch; and
   an RS flip flop configured to receive outputs of the first comparator and the second comparator to generate a pulse width modulation signal, wherein an output voltage from the error amplifier will be substantially constant during continuous conduction mode and discontinuous conduction mode and wherein an output voltage is proportional to a clamp voltage during discontinuous conduction mode.

2. The DC-DC converter of claim 1, wherein
   the output of the first comparator is electrically connected to the RESET input of the RS flip flop; and
   the output of the second comparator is electrically connected to the SET input of the RS flip flop.

3. The DC-DC converter of claim 1, wherein the rising ramp generator comprises a current source configured to generate a first rising ramp signal.

4. The DC-DC converter of claim 3, wherein the current source is configurable to adjust the slew rate of the first rising ramp signal to adjust the on-time of the oscillator.

5. The DC-DC converter of claim 1, wherein the falling ramp generator comprises a current sink configured to generate the falling ramp signal.

6. In a DC-DC converter comprising a high side switch coupled between an input node and a switch node, a low side switch coupled between the switch node and a reference potential, and an inductor coupled between the switch node and an output, a controller comprising:
   a voltage mode control comprising:
   a rising ramp signal generator for generating a first control signal by comparing a rising ramp signal to an output of an error amplifier in a first comparator;
   a falling ramp signal generator for generating a second control signal by comparing a falling ramp signal to the output of the error amplifier in a second comparator;
   means for combining the first and the second control signals to generate a pulse width modulated (PWM) signal for controlling a regulator;
   a falling ramp clamp configured to clamp an output of the falling ramp signal generator to a fixed value proportional to an output voltage when the converter enters a discontinuous conduction mode, wherein an output voltage from the error amplifier will be substantially constant during continuous conduction mode and discontinuous conduction mode and wherein the output voltage is proportional to a clamp voltage during discontinuous conduction mode.

7. A method of operating a controller for a DC-DC converter comprising:
   controlling the DC-DC converter and a voltage mode control comprising:
   generating a rising ramp signal for generating a first control signal by comparing the rising ramp signal to an error amplifier output;
   generating a falling ramp signal for generating a second control signal by comparing the falling ramp signal to the error amplifier output;
   combining the first and the second control signals to generate a pulse width modulated (PWM) signal for controlling a regulator;
   clamping the falling ramp signal to a fixed value proportional to an output voltage when the converter enters a discontinuous conduction mode, wherein an output voltage from the error amplifier will be substantially constant during continuous conduction mode and discontinuous conduction mode and wherein the output voltage is proportional to a clamp voltage during discontinuous conduction mode.

8. The power supply control circuit of claim 6, further comprising a zero crossing comparator configured to determine when the inductor current enters discontinuous conduction mode.

9. The power supply control circuit of claim 6, wherein the falling ramp signal is clamped to a fixed value.

10. The power supply control circuit of claim 6, further comprising a current source configured to generate the first rising ramp signal.

11. The power supply control circuit of claim 10, wherein the current source is configurable to adjust a slew rate of the first rising ramp signal to adjust the on-time of the oscillator.

12. The method of claim 7, further comprising determining when the converter enters discontinuous conduction mode by monitoring inductor current in the DC/DC converter.

13. The method of claim 12, wherein the determining step comprises monitoring the inductor current with a zero crossing comparator, the zero crossing comparator outputting a logic level HIGH signal when the inductor current substantially reaches zero, the determining of discontinuous conduction mode having been entered when N consecutive logic level HIGH levels are detected.

14. The method of claim 7, wherein the falling ramp signal is clamped to a fixed value.

15. The method of claim 7, wherein the falling ramp signal is clamped to a value substantially proportional to the output.

16. The method of claim 7, further comprising reducing a slew rate of the first rising ramp signal to increase an on time of the oscillator, generating hysteresis for the clamping.

* * * * *